United States Patent [19]

Freed

[11] Patent Number: 5,377,387
[45] Date of Patent: Jan. 3, 1995

[54] TWO-WAY ADJUSTABLE TIE

[76] Inventor: Anna B. Freed, 185 E. 85th St., Suite 2-L, New York, N.Y. 10028

[21] Appl. No.: 22,354

[22] Filed: Feb. 25, 1993

[51] Int. Cl.6 .............................................. B65D 63/00
[52] U.S. Cl. .................................. 24/16 PB; 24/17 AP
[58] Field of Search ............ 24/17 AP, 16 PB, 30.5 P, 24/713.2, 713.4, 714.6, 129 A, 134 KB, 136 L

[56] References Cited

U.S. PATENT DOCUMENTS

| | | |
|---|---|---|
| 880,116 | 2/1908 | Arnow . |
| 1,907,778 | 1/1932 | Freysinger . |
| 2,138,542 | 1/1938 | Goldberg . |
| 3,200,464 | 8/1963 | Cousins . |
| 3,224,056 | 12/1965 | Joffe . |
| 3,422,499 | 11/1967 | Merser . |
| 3,653,099 | 4/1972 | Hoffman ............................ 24/16 PB |
| 3,654,669 | 4/1972 | Fulton ................................ 24/16 PB |
| 3,721,750 | 3/1973 | Countryman ...................... 24/16 PB |
| 3,747,163 | 7/1973 | Serino . |
| 3,747,164 | 7/1973 | Fortsch . |
| 3,748,699 | 7/1973 | Cunningham . |
| 4,263,697 | 4/1981 | Speedie . |
| 4,501,354 | 2/1985 | Hoffman . |
| 4,557,023 | 12/1985 | Six et al. . |
| 4,566,158 | 1/1986 | Lau . |
| 4,573,242 | 3/1986 | Lankton et al. . |
| 4,577,375 | 3/1986 | Beaussant . |
| 4,615,185 | 10/1986 | Bollinger . |
| 4,665,588 | 5/1987 | Nakano ............................... 24/16 PB |
| 4,680,834 | 7/1987 | Andre . |
| 4,788,751 | 12/1988 | Shely et al. . |
| 4,862,561 | 9/1989 | Lichtenberg . |
| 4,897,899 | 2/1990 | Shely et al. . |
| 4,908,911 | 3/1990 | Bretti et al. . |
| 5,224,244 | 7/1993 | Ikeda et al. ....................... 24/17 AP |

FOREIGN PATENT DOCUMENTS

| | | | |
|---|---|---|---|
| 0641916 | 4/1964 | Belgium ............................ | 24/16 PB |
| 0845995 | 7/1970 | Canada ............................. | 24/16 PB |

OTHER PUBLICATIONS

Tach-It TM Cable Ties, Clements Industries, Inc. 1992.

Primary Examiner—Victor N. Sakran
Attorney, Agent, or Firm—Darby & Darby

[57] ABSTRACT

A one piece reusable and releasable tie having no moving parts, and having the ability to be readily adjusted (loosened/tightened) in discrete increments while tied. Nine embodiments are disclosed having different shaped projections or patterns on the strap and complimentary projections in the holder. Each of the embodiments are symmetrically adjustable (tightened or loosened) using similar movements. To adjust the tie, the user pulls on the strap in the desired direction, and either moves (turns) the holder or pulls (toggles) the strap, causing the tie to tighten or loosen in discrete increments. To lock, the holder and strap are returned to a fixed position. The tie can be configured as a one piece tie, as a tie with variable length strap and a double holder, or as two pieces (strap and holder).

28 Claims, 10 Drawing Sheets

TWO-WAY ADJUSTABLE TIE

BACKGROUND OF THE INVENTION

1. Field of the Invention

The present invention relates to ties, fasteners, straps, or belts and, in particular, to a two-way adjustable tie which can be used to tie garments, packages, cables, orthopedic devices, etc.

2. Background Information

Conventional embodiments of reusable ties commonly consist of ties made of plastic and ties made of velcro. Conventional reusable plastic ties include ties that are "adjustable" in one direction and "releasable" in the other direction. These conventional ties often contain a ratchet and pawl mechanism. The ratchet allows discrete adjustment (tightening) in one direction. The pawl allows continuous release (loosening) in the opposite direction. The pawl must be biased to release the strap and often wears out or breaks down after repeated usage. The pawl additionally may require excessive physical strength and/or dexterity to operate. Conventional art ties made of velcro do not have as strong a gripping capability and tend to further lose their grip after repeated usage or laundering. Additionally, velcro ties must be totally undone to be adjusted (tightened or loosened). The Two-Way Adjustable Tie of the present invention does not have the numerous disadvantages of conventional plastic and velcro ties described above.

SUMMARY OF THE INVENTION

The ties of the present invention have many benefits over conventional plastic ties including: (1) the ties of the present invention are readily adjustable and/or releasable in "both" directions; (2) the ties of the present invention have no moving parts to wear out or break down; and (3) the ties of the present invention require significantly less strength and/or dexterity to loosen or release the tie.

The Two-Way Adjustable Tie of the present invention can readily be adjusted (in either direction) by either moving (turning) the holder or pulling (toggling) the strap. The ties of the present invention have many advantages over velcro including: (1) the ties of the present invention do not wear out and lose their grip as velcro does; (2) the ties of the present invention can be adjusted, both tightened or loosened, while tied; and (3) the ties of the present invention are significantly stronger than velcro.

The nine embodiments of the present invention function similarly. They are locked when the strap and holder are in a fixed position relative to each other and unlocked (adjustable and/or releasable) when the strap and holder are not in this fixed position. Each of the nine embodiments loosen and tighten symmetrically. The same toggling, turning or pulling motion will either loosen or tighten the tie. The source of tension on the strap determines whether the tie will be loosened or tightened. Tension on the strap, in addition to either pulling (toggling) the strap or moving (turning) the holder causes the holder and strap to be out of alignment (unlocked), which permits the adjustment (loosening or tightening) of the tie. The embodiments shown are similar in function and utility, however, any given embodiment may prove easier to use, cheaper to manufacture, more durable and/or reliable, more suited for a given purpose or a specific demographic segment. In any of these embodiments, the movements to adjust the tie (loosen or tighten) are similar. First (to unlock), the strap can be pulled (toggled) or holder can be moved (turned). Second (to adjust), the strap is pulled in either direction, the directional source of "the pull" will determine whether the tie will be tightened or loosened. The disorientation of the strap to the holder created by the user, unlocks the tie thus permitting the strap to move through the holder in either direction for tightening or loosening. If the user does nothing, the tension on the strap automatically forces the strap to become perpendicularly oriented to the holder, and hence default to the locked position. In the sneaker illustrated in FIG. 3, for example, the "Two-Way Adjustable Tie" could advantageously be used instead of either laces or velcro. The holder and strap could be configured with tacks to fit into the lace holes. The sneaker with a tie of FIG. 6, for example, could be adjusted by pulling on the strap until the desired snugness is achieved. To unlock, the user simply turns the holders 90 degrees and slips out of the sneaker. The ties of the present invention have an advantage over laces because: (1) they do not loosen during wear; (2) they do not come undone; (3) they do not wear out or become dirty; and (4) they are easier to tie and adjust than laces (this is especially important for children and the elderly who might lack manual dexterity or strength).

The Two-Way Adjustable Tie of the present invention can be adjusted in either direction. While pulling the strap in either of the desired directions, the user may either: (1) pull (toggle) the strap as in FIGS. 5A–5E, 9A–9E, 13A–13E, 17A–17E, and 19A–19E; or (2) move (turn) the holder as in FIGS. 7A–7E, 11A–11E, 15A–15E, and 21A–21E.

Figure 1:
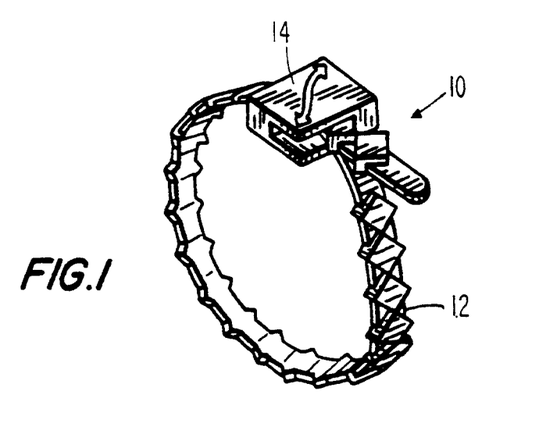
FIG. 1 shows a perspective view of the strap and holder configured as a one piece tie.

An object of the present invention is for a tie which is inexpensive to manufacture, e.g., by being capable of being made of only one piece of plastic as illustrated in FIG. 1.

A further object is to produce a tie having no moving parts to wear out or break down, is durable and reliable, is adjustable in both directions, is releasable, reusable, and versatile.

Another object of the present invention is to produce a reusable tie which is both strong and readily adjustable.

It is a further object to produce a tie which can be tightened or loosened without untying (i.e., is readily adjustable), and a tie which can be released without destroying (i.e., is reusable).

Figure 2A:
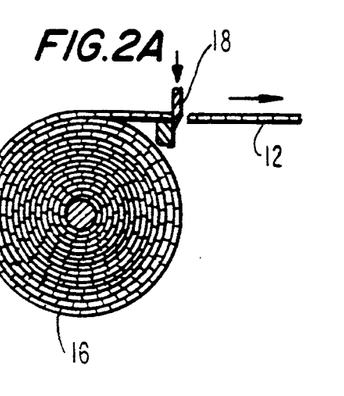
FIG. 2A shows a strap being cut to a desired length.
Figure 2B:
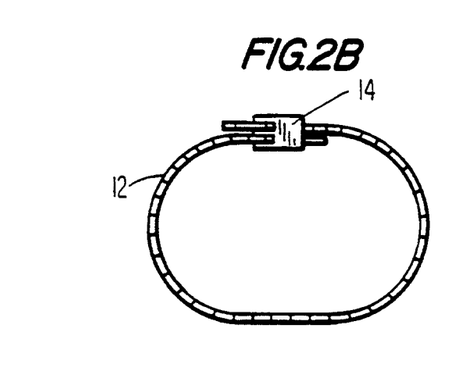
FIG. 2B shows a tie configured with a double holder which may accommodate the strap of FIG. 2A cut to a desired length.

Another object of the present invention is to create a tie of any length as illustrated in FIG. 2A. This both eliminates waste and the need to inventory different length ties. The strap could therefore be manufactured on a roll as shown in FIG. 2A, and be cut as needed to any desired length. These ties could use "double holders" as illustrated in FIG. 2B, which would be obtained separately.

Figure 3:
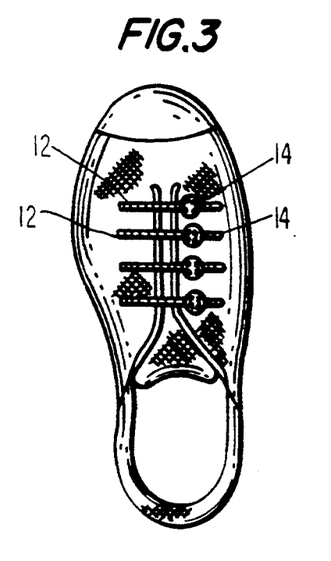
FIG. 3 shows a tie configured as a 2 piece tie for use as a sneaker accessory replacing laces.

Another object of the present invention is for a tie which can be configured to come in two parts, such as a strap and holder as illustrated in FIG. 3. The strap and holder are attached to the two sides of the item bound.

Another object of the present invention is for the inner surface of the strap to be generally flat, so as not to damage the contents it binds.

Another object of the present invention is for the strap to contain numerical indicia on the repeated projections so that the tie can be set to a fixed position and also be used to measure the girth of the contents it binds.

Another object of the present invention is for a tie which can be both tightened and loosened while requiring a minimum of physical strength or dexterity.

Another object of the present invention is for a tie which can be adjusted using only one hand.

Another object of the present invention is for a strap which is adjustable in discrete increments ranging from very small to very large.

Other objects, features and characteristics of the present invention, as well as the methods of operation and functions of the related elements of structure, and the combination of parts and economies of manufacture will become more apparent upon consideration of the following detailed description and the appended claims with reference to the accompanying drawings all of which form a part of the specification, wherein like reference numerals designate corresponding parts in the various figures.

BRIEF DESCRIPTION OF THE DRAWINGS

The invention will further be described with reference to the following drawings, in which.

DETAILED DESCRIPTION OF THE PRESENTLY PREFERRED EXEMPLARY EMBODIMENTS

The tie 10 of the present invention may be formed, for example, in any of the following three ways:

(1) As a one piece assembly as is shown by way of example in FIG. 1. The tie 10 includes a strap 12 whose one end is integrally connected to a holder 14 and whose other end is capable of being adjustably and releasably connected to the holder 14;

(2) As a two piece assembly having a variable length strap and a double holder as is shown by way of example in FIG. 2B. The double holder 14 holds both ends of the strap 12. Each end of the strap 12 has been cut to a desired length from the bulk strap material that can be conveniently mounted on a roll 16 as illustrated in FIG. 2A; or (3) As a two piece assembly with each piece attached to the item being bound as is shown by way of example to a sneaker accessory in FIG. 3.

Figure 4:
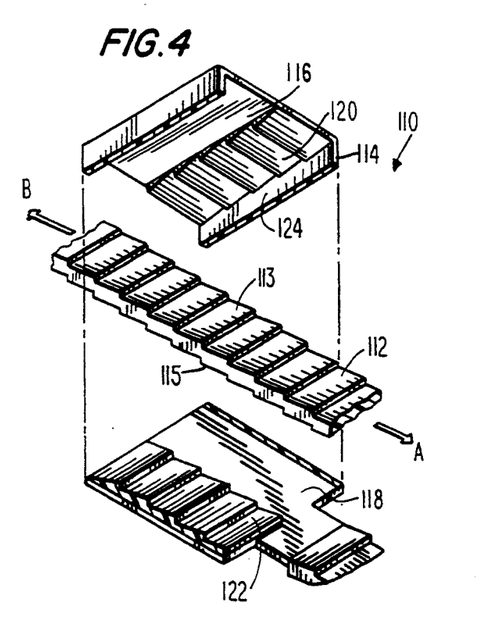
FIG. 4 shows an exploded isometric view of a one piece Two-Way Adjustable Tie strap with ratchet teeth on its upper and lower surfaces and the holder with parallel ratchet teeth on the upper and lower inner surfaces.
Figure 5A:
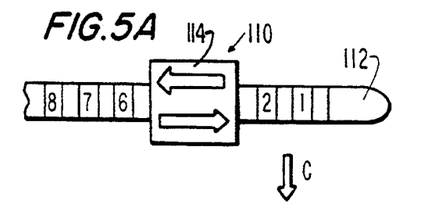
FIG. 5A shows a top view of the tie of FIG. 4 in locked position.
Figure 5B:
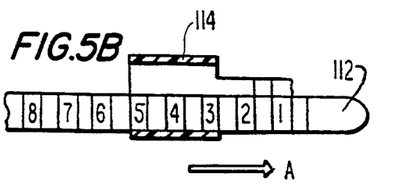
FIGS. 5B-5C shows the consecutive movements required to tighten the strap by one ratchet tooth.
Figure 5C:
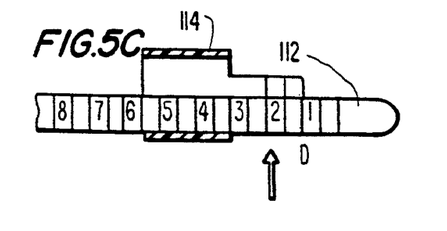
Figure 5D:
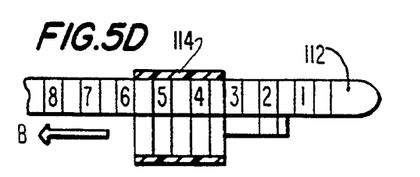
FIGS. 5D-5E shows the consecutive movements required to loosen the strap by one ratchet tooth.
Figure 5E:
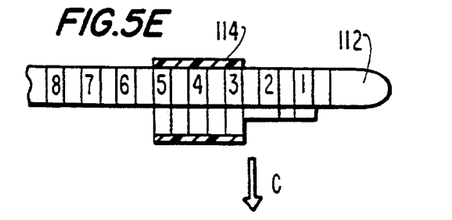
Figure 5F:
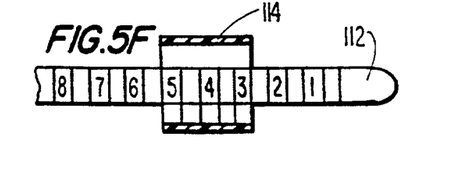
FIG. 5F shows the locked position where the strap cannot move in either direction.

A first embodiment of the present invention is shown in FIGS. 4-5F. The one piece tie 110 includes a strap 112 and a holder 114. The strap 112 includes a first set of ratchet teeth 113 on its upper surface and a second set of ratchet teeth 115 on its lower surface. The holder 114 includes an upper inner surface 116 and a lower inner surface 118. The upper inner surface 116 is integrally connected to the lower inner surface 118 as a one piece assembly by connecting members 124.

The teeth 113 are shaped to mate with the teeth 120 so that the strap 112 will not move in the direction of arrow A, but allows ratcheting movement in the direction of arrow B. Similarly, the teeth 115 are shaped to mate with the teeth 122 so that the strap 112 will not move in the direction of arrow B, but allows movement in the direction of arrow A.

The upper inner surface 116 of the holder 114 includes approximately half of its surface being covered by ratchet teeth 120. The lower inner surface 118 also includes about half of its surface being covered by ratchet teeth 122. The ratchet teeth 120 are positioned on the opposite half of the surface being covered by the ratchet teeth 122. Also, the ratchet teeth 120 and 122 are arranged to ratchet in opposite yet parallel directions. The width of the ratchet teeth 120, 122 is slightly larger than the width of the ratchet teeth 113 on the strap 112.

Figure 4A:
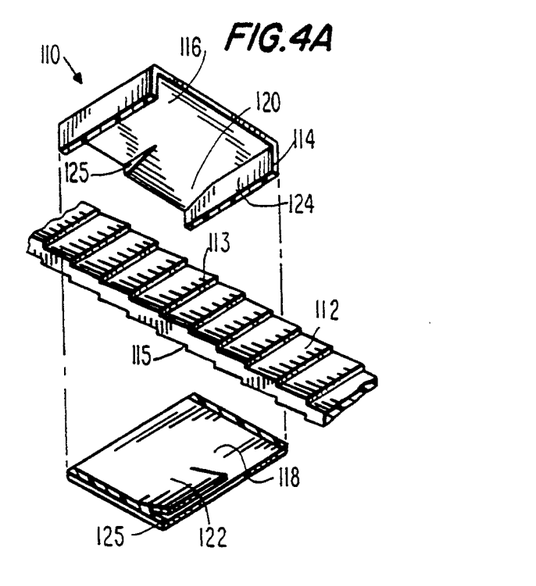
FIG. 4A shows a two piece tie of FIG. 4 with one ratchet tooth on the upper and lower inner surfaces.

FIG. 4A shows the holder with only one ratchet tooth on its upper and lower surface. A groove 125 shown in each tooth adds strength and flexibility to the ratchet tooth. Of course, any of the holders in any of the embodiments employing ratchet teeth could be formed with only one ratchet tooth on its upper and lower inner surface or with grooves or a pawl under the ratchet teeth to increase the holding force or elasticity of the teeth.

FIG. 5A shows the tie 110 in the locked position. The consecutive motions required between the holder 114 and the strap 112 to tighten and loosen the strap by one ratchet tooth are shown in FIGS. 5B–5F. From the locked position, strap 112 is moved with respect holder 114 in the direction of arrow C. That is, generally perpendicular to the direction of arrows A and B, with respect to the holder 114. Of course, the strap 112 could be held stationary and the holder 114 be moved in the direction opposite of arrow C, or a combination of both these two movements could be made. FIG. 5B shows the strap 112 and the holder 114 in the position where the strap 112 has been moved as far as possible in the direction of arrow C. Now, the user will pull strap 112 with respect to the holder 114 in the direction of arrow A by one or more ratchet teeth. FIG. 5C shows the strap 112 advanced by one tooth with respect to the holder 114. During this movement the user will feel the ratcheting effect as the strap 112 moves forward one tooth. In this process the strap 112 can be tightened. To loosen the strap 112 with respect to the holder 114, the user will simply move the strap 112 with respect to the holder 114 in the direction of arrow D, opposite of arrow C. FIG. 5D shows the strap 112 in the position where the strap 112 has been moved as far as possible in the direction of arrow D. Now the user will pull the strap 112 with respect to the holder 114 in the direction of arrow B, that is, the direction opposite that of arrow A. FIG. 5E shows the strap being moved one tooth from the position shown in FIG. 5D. In this way the strap 112 can be loosened to the desired length. Again the user can feel each tooth as the ratchet moves over them. After the strap 112 has been adjusted to the desired length, the strap 112 can be moved to the center position with respect to the holder 114 as shown in FIGS. 5A and 5F. Now, the strap 112 is in the locked position with respect to the holder 114 and the strap 112 cannot move in either direction A or B.

Figure 6:
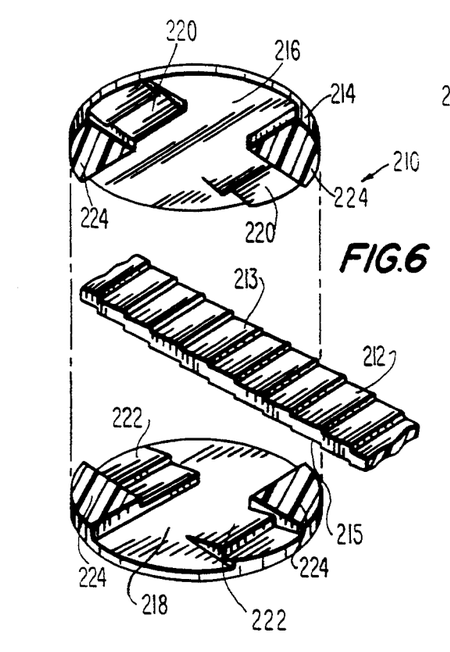
FIG. 6 shows an exploded isometric view of the Two-Way Adjustable Tie strap with ratchet teeth on its upper and lower surface and the holder with perpendicular ratchet teeth on the upper and lower inner surfaces.
Figure 7A:
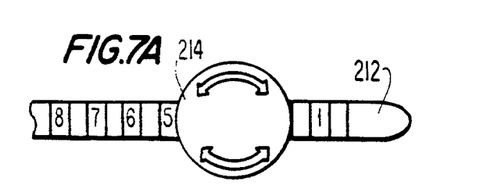
FIGS. 7A-7F shows the consecutive movements required to tighten the strap FIGS. 7B-7C, and loosen the strap FIGS. 7D-7E, by one ratchet tooth.
Figure 7B:
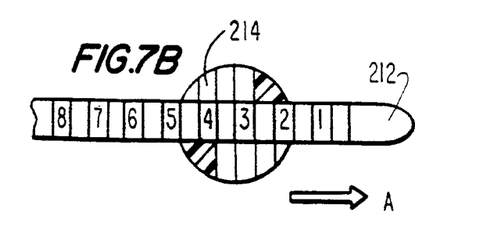
Figure 7C:
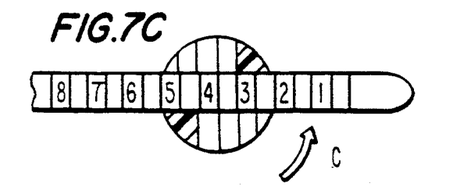
Figure 7D:
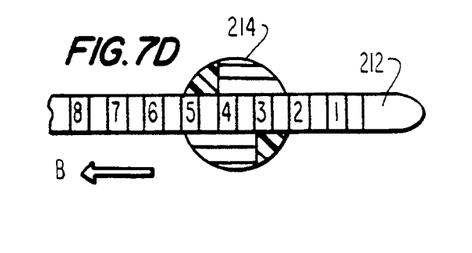
Figure 7E:
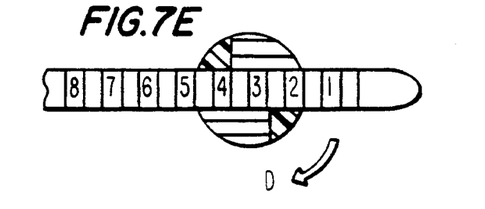
Figure 7F:
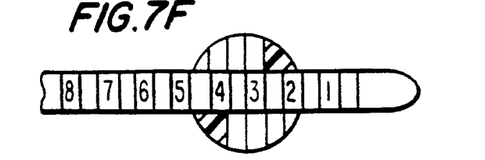

A second embodiment of the present invention is shown in FIGS. 6–7F. The two piece tie 210 includes a strap 212 and a holder 214. The strap 212 includes a first set of ratchet teeth 213 on its upper surface and a second set of ratchet teeth 215 on its lower surface. The holder 214 includes an upper inner surface 216 and a lower inner surface 218. The upper inner surface 216 is integrally connected to the lower inner surface 218 as a one piece assembly by connecting members 224.

The teeth 213 are shaped to mate with the teeth 220 so that the strap 212 will not move in the direction of arrow A, but allows ratcheting movement in the direction of arrow B. Similarly, the teeth 215 are shaped to mate with teeth 222 so that the strap 212 will not move in the direction of arrow B, but allows movement in the direction of arrow A.

Figure 6A:
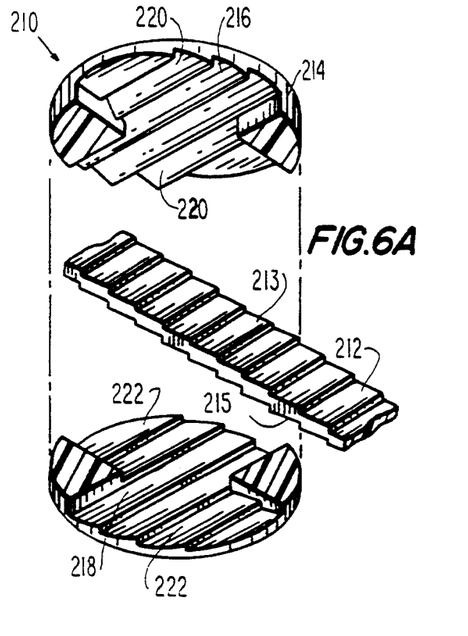
FIG. 6A shows FIG. 6 with the entire upper and lower inner surfaces of the holder having perpendicular ratchet teeth.

A portion of the upper inner surface 216 of the holder 214 includes ratchet teeth 220. The lower inner surface 218 has an equivalent portion which includes ratchet teeth 222. The embodiment of the holder 214, illustrated in FIG. 6A, includes substantially the entire portion of the upper inner surface 216 having ratchet teeth 220 and substantially the entire lower inner surface 218 having ratchet teeth 222. In both embodiments, the ratchet teeth 220 and 222 are shown as being oriented at approximately 90 degrees from one another. The upper portion of the holder 214 is integrally connected to the lower portion of the holder by connecting members 224. The inner sides of the connecting members 224 are parallel and spaced at a distance slightly greater than the strap to guide the strap through the holder. The inner angle of the connecting members 224 is shown at approximately 90 degrees. However, if the ratchet teeth 220 and 222 are arranged at angles other than 90 degrees, such as, for example, 45 degrees, then the connecting members 224 would have an angle of 135°.

FIG. 7A shows the tie 210 in the locked position. The consecutive motions required between the holder 214 and the strap 212 to tighten and loosen the strap by one ratchet tooth are shown in FIGS. 7B–7F. As illustrated in FIG. 7B to tighten the strap 212 the user would first move the strap 212 with respect to the holder 214 in the direction of arrow A. As the strap 212 moves in the direction of arrow A the user will feel the strap 212 ratchet with respect to the holder 214. In FIG. 7C the strap 212 is shown with the strap being tightened by one tooth. Of course, the user can then continue to tighten the strap 212 by any number of teeth to the desired length. To loosen the strap 212 the user will first rotate the holder 214 in the counterclockwise direction as indicated by arrow C to the position shown in FIG. 7D. The user can now move the strap 212 in the direction of arrow B, opposite the direction of arrow A with respect to the holder 214. The user can then feel the strap ratchet with respect to the holder as the strap 212 moves over each tooth to be loosened. The strap 212 has been loosened by one tooth as illustrated in FIG. 7E. To allow continuous release of the strap in either direction the user turns the holder in the direction of D half way between 7E and 7F. In this orientation, the ratchets of the strap are not engaged with the ratchets in the holder and the strap may be moved continuously for tightening or loosening. To lock the holder, the user can then simply rotate the holder in the clockwise direction as illustrated by arrow D until the holder 214 is positioned as illustrated in FIG. 7F. In this position, the strap 212 cannot be loosened.

Figures 8, 9A:
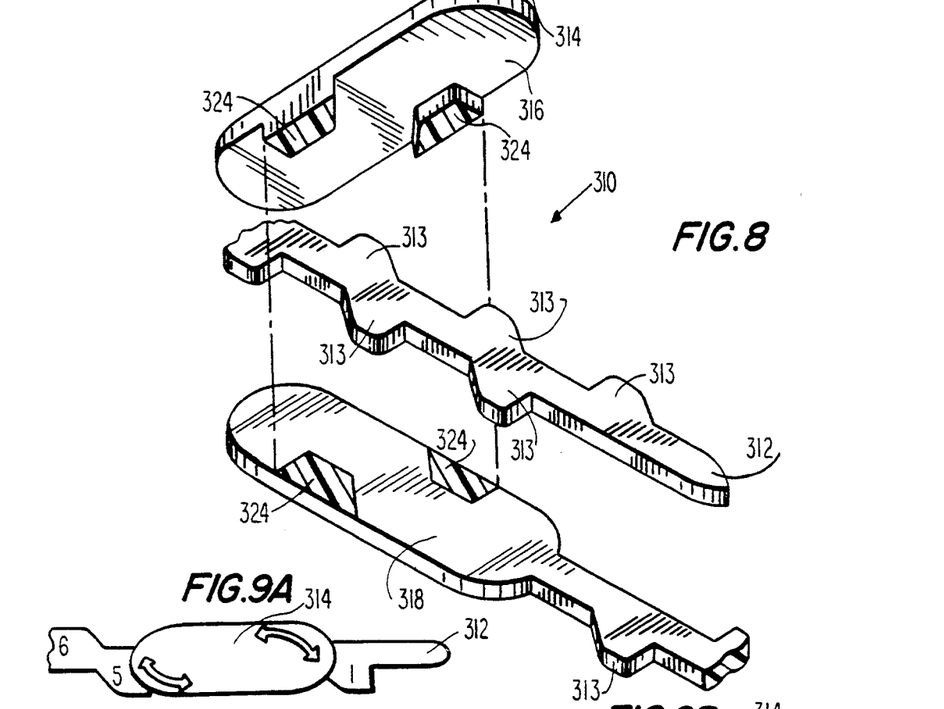
FIG. 8 shows an exploded isometric view of the Two-Way Adjustable Tie strap with generally triangular projections showing the strap moving through the holder with generally complimentary projections.
FIGS. 9A-9F shows the consecutive back and forth motions on the strap required to tighten the tie of FIG. 8 by one projection.
Figures 9B, 9C, 9D, 9E, 9F:
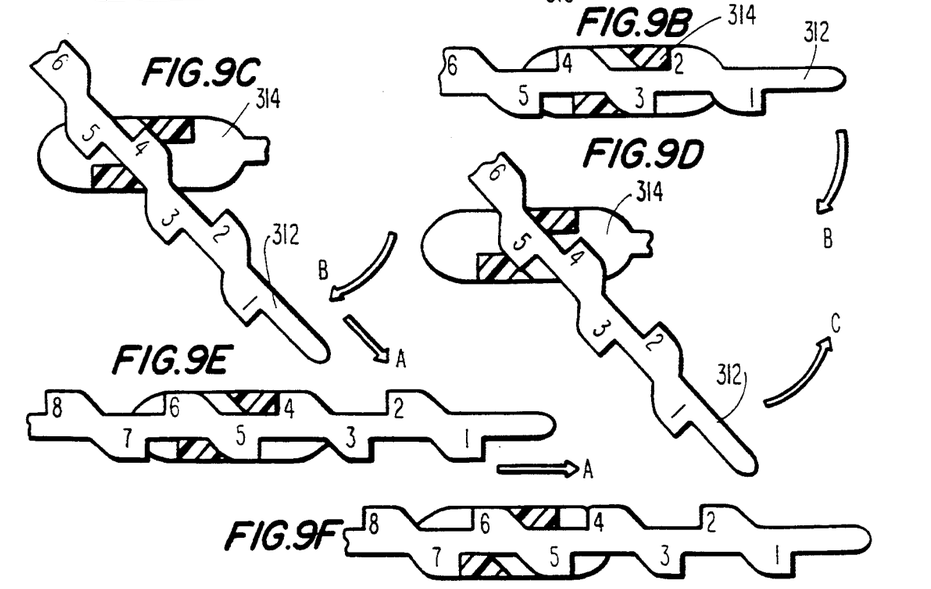

A third embodiment of the present invention is shown in FIGS. 8–9F. The one piece tie 310 includes a strap 312 and holder 314. The strap 312 includes a plurality of triangular-shaped projections 313. The projections 313 are alternately arranged on opposite sides of the strap 312. The holder 314 includes an upper inner surface 316 and a lower inner surface 318. The upper inner surface 316 is integrally connected to the lower inner surface as a one piece assembly by a pair of triangular-shaped connecting members 324.

FIG. 9A shows the tie 310 in the locked position. The consecutive motions required between the holder 314 and the strap 312 to tighten the strap are shown in FIGS. 9B-9F. FIG. 9A shows the strap 312 in a locked position with respect to the holder 314. To unlock the tie 310 for adjustment the user will first toggle the strap 312 in the clockwise direction B, with respect to the holder 314, as illustrated in FIG. 9C. After the strap moves to its furthest position in the clockwise direction B as shown in FIG. 9C, the user will then pull the strap 312 in the direction of arrow A to tighten (or in the direction opposite A to loosen) the strap 312. The strap 312 will then reach the position as shown in FIG. 9D. Now, the user can rotate the strap 312 with respect to the holder 314 in the counterclockwise direction of arrow C. The strap is then in the position as shown in FIG. 9E. In this position the strap 312 cannot be moved in the direction opposite of arrow A and it can only be advanced the distance of approximately one-half the length of the projection in the direction of arrow A as shown in FIG. 9F. In this manner, the strap 312 can be tightened.

Figures 10, 11A:
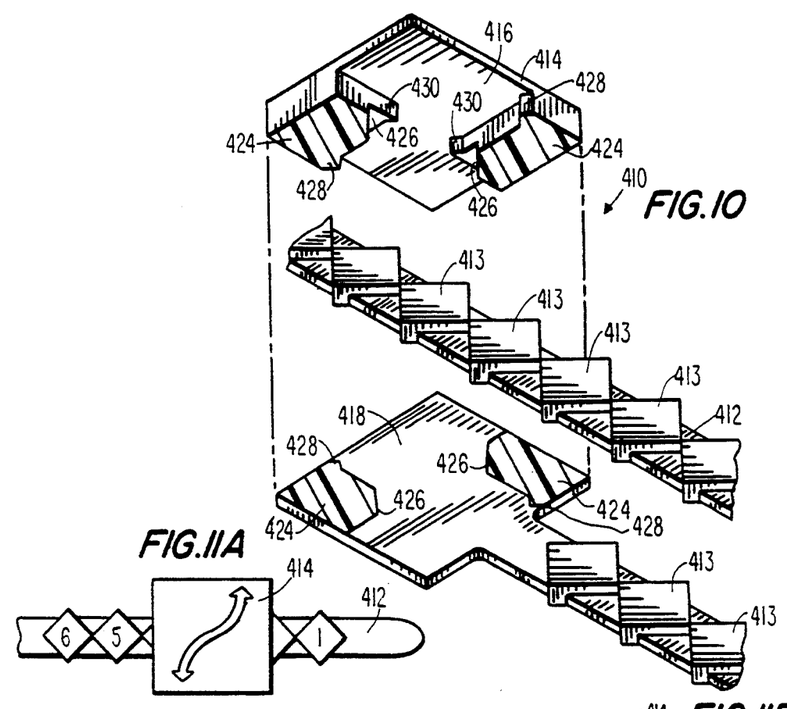
FIG. 10 shows an exploded isometric view of the Two-Way Adjustable Tie strap with square projections and the holder with generally complimentary projections.
FIGS. 11A-11F shows the consecutive back and forth motions on the holder required to tighten the tie by one projection.
Figure 11B:
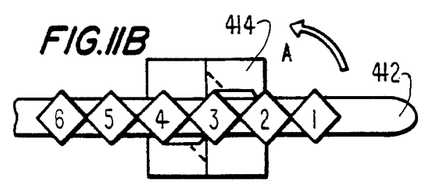
Figure 11C:
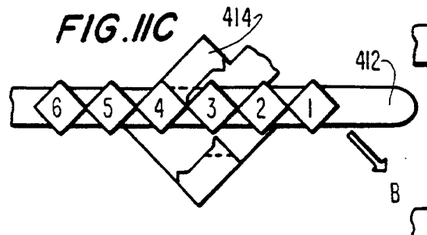
Figures 11D, 11E:
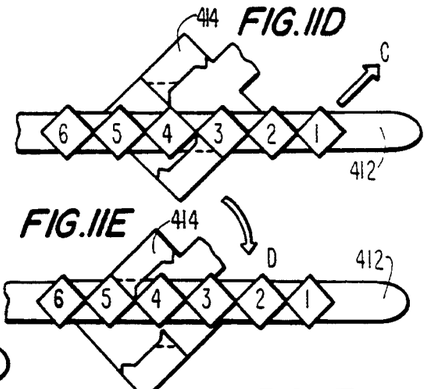
Figure 11F:
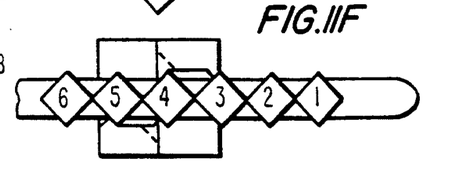

A fourth embodiment of the present invention is shown in FIGS. 10-11F. The one piece tie 410 includes a strap 412 and a holder 414. The strap 412 has a plurality of square-shaped projections 413 on its upper surface which are flush with its lower surface. The holder 414 includes an upper inner surface 416 and a lower inner surface 418. The upper inner surface 416 is integrally connected to the lower inner surface 418 as a one piece assembly by two approximately rectangular-shaped connecting members 424. The connecting members 424 includes a recessed base portion 426. Each connecting member 424 also includes notch-shaped protrusions 428 and 430.

FIG. 11A shows the tie 410 in the locked position. The consecutive motions required between the holder 414 and the strap 412 to tighten the strap are shown in FIGS. 11B-11F. First, to unlock, the holder 414 is rotated in the counterclockwise direction, with respect to the strap 412, as shown by the arrow A in FIG. 11B. The tie is now unlocked and the strap may move in either direction for tightening or loosening by one or more projections. Next, the strap 412 is pulled in the direction of arrow B with respect to the holder 414 as illustrated in FIG. 11C. The strap 412 is then moved in the direction of arrow C with respect to the holder 414 as shown in FIG. 11D. This combination movement in the direction of B and C is repeated for each projection moved. The strap 412 has now been tightened by one projection with respect to the holder 414. Next, to lock, the holder 414 is rotated in the clockwise direction with respect to the strap 412 as shown by arrow D in FIG. 11E. In the position illustrated by FIG. 11F, the strap 412 is again locked with respect to the holder 414. The strap is kept locked by the notch shaped protrusions 428 and 430 on the connecting members 424.

Figures 12, 13A, 13B, 13C, 13D, 13E, 13F:
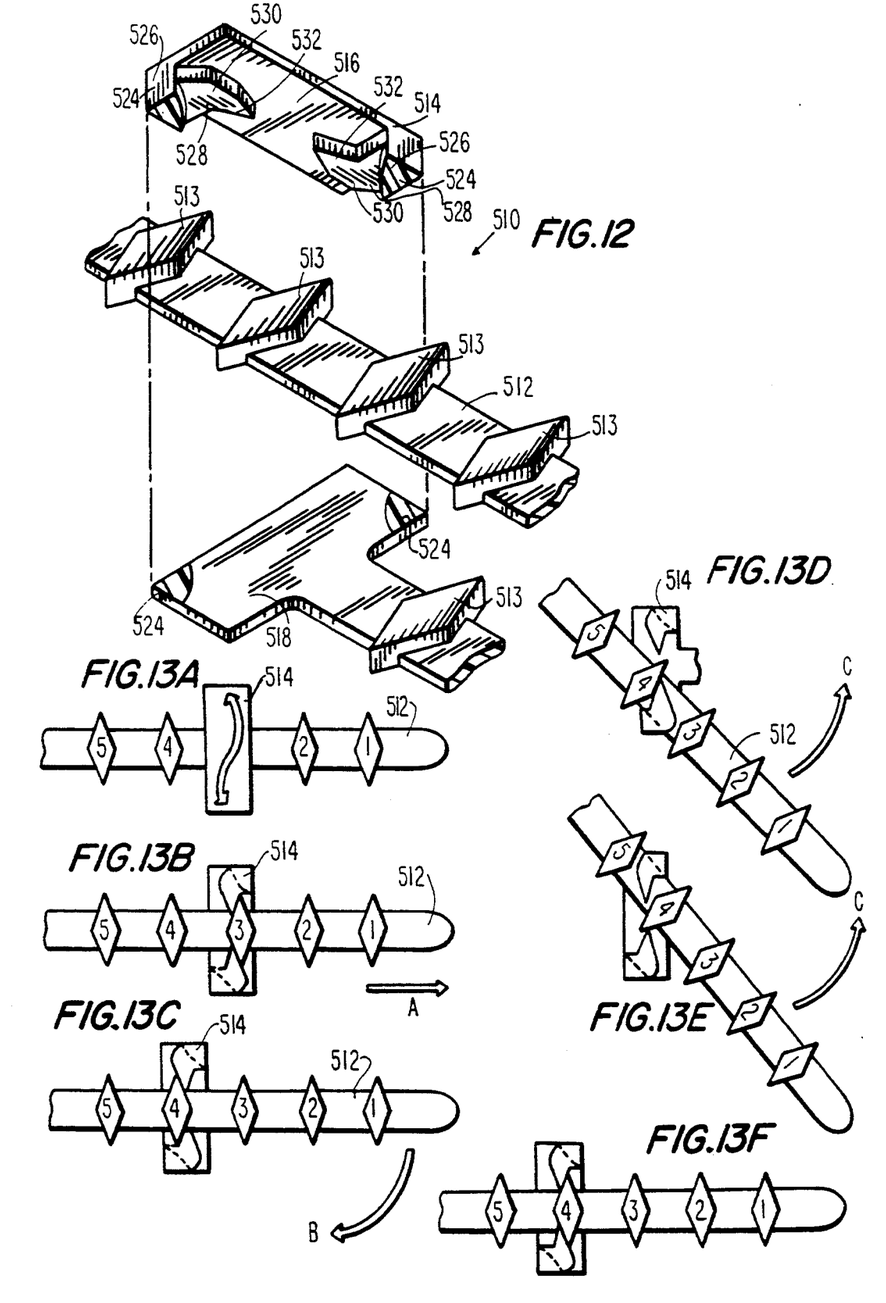
FIG. 12 shows an exploded isometric view of the Two-Way Adjustable Tie strap with diamond-shaped projections and the holder with generally complimentary projections.
FIGS. 13A-13F shows the consecutive back and forth motions on the strap required to tighten the tie by one projection.

A fifth embodiment of the present invention is shown in FIGS. 12-13F. The tie 510 includes a strap 512 and a holder 514. The strap 512 includes a plurality of diamond-shaped projections 513 on its upper surface which are flush with its lower surface. The holder 514 includes an upper inner surface 516 and a lower inner surface 518. The upper inner surface 516 is integrally connected to the lower inner surface 518 as one piece assembly by connecting members 524. Each connecting member 524 includes a recessed base portion 526. A portion 528 extends beyond the recessed base portion 526 and is approximately ⅔ the height of the base portion 526. Portion 528 includes an arcuate-shaped projection portion 530 and a triangular-shaped projection portion 532.

FIG. 13A shows the tie 510 in the locked position. The consecutive motions required between the holder 514 and the strap 512 to tighten the strap are shown in FIGS. 13B-13F. First, the strap is shown in the locked position in FIG. 13B. The user first pulls on the strap 512 with respect to the holder 514 in the direction of arrow A. Then, the user will rotate the strap 512 in the clockwise direction indicated by arrow B, with respect to the holder 514 until the strap 512 reaches the position as shown in FIG. 13D. The tie is now unlocked and the strap 512 can be pulled in either direction to tighten or loosen. The strap 512 is then rotated in the opposite, counterclockwise direction, indicated by arrow C as shown in FIG. 13D. As shown in FIG. 13E, the strap 512 continues to be rotated in the counterclockwise direction, as shown by arrow C, until the projection 528 in the holder 514 clears the strap 512. The strap is then moved to the position as shown in FIG. 13F and again is in the locked position. The strap has now been tightened by one projection with respect to the position shown in FIGS. 13A and 13B.

Figure 14:
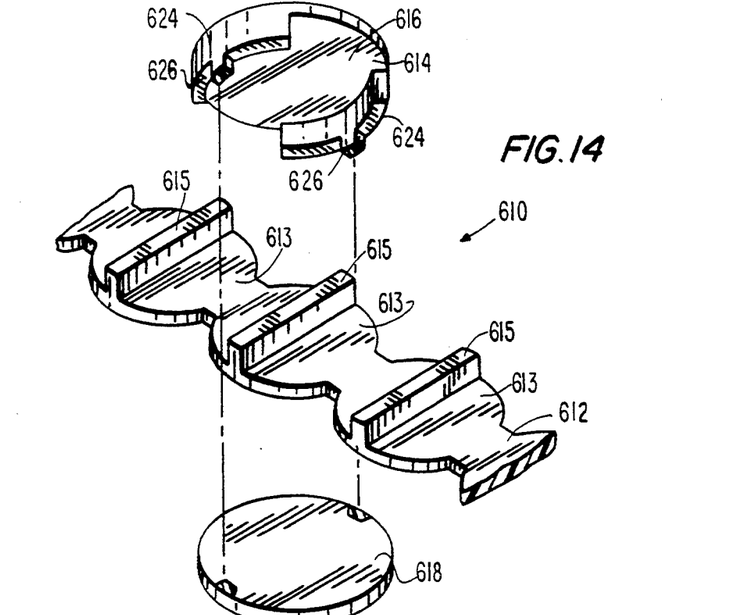
FIG. 14 shows an exploded isometric view of the Two-Way Adjustable Tie strap with circular projections having transverse bars and the holder with generally complimentary projections.
Figures 15A, 15B, 15C, 15D, 15E, 15F:
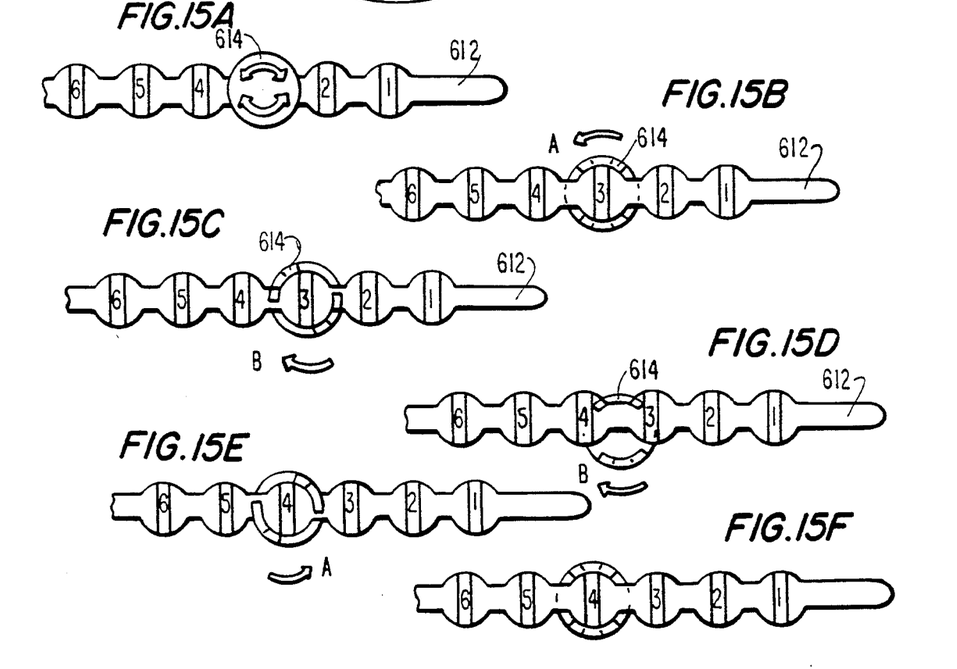
FIGS. 15A-15F shows the consecutive back and forth motions on the holder required to tighten the tie by one projection.

A sixth embodiment of the present invention is shown in FIGS. 14-15F. The tie 610 includes a strap 612 and a holder 614. The strap 612 includes a plurality of circular projections 613. A bar-shaped member 615 is placed transversely across the strap at the center of each circular projection 613. The holder 614 includes and upper inner surface 616 and a lower inner surface 618. The upper inner surface 616 is integrally connected to the lower inner surface 618 by arcuate-shaped connecting members 624. The connecting members 624 include a recessed base portion 626. The recessed base portions 626 are approximately ⅓ of the height of the connecting members 624.

FIG. 15A shows the tie 610 in the locked position. The consecutive motions required between the holder 614 and the strap 612 to tighten the strap are shown in FIGS. 15B-15F. First, the holder 614 is rotated in the counterclockwise direction as indicated by arrow A in FIG. 15B. At this point, the arcuate-shaped connecting members 624 clear the bar-shaped member 615. Next, the holder 614 is rotated in the clockwise direction as indicated by arrow B in FIG. 15C until the holder 614 reaches the position shown in FIG. 15D. The holder 614 is again rotated in the clockwise direction, indicated by arrow B, until the arcuate-shaped connecting members 624 clear the bar-shaped member 615. The holder 614 is then rotated in the counterclockwise direction as indicated by arrow A in FIG. 15E until the upper portion 624 intersects the center line of the bar-shaped member 615. The holder 614 is now positioned as shown in FIG. 15F with respect to the strap 612. The strap 612 has now been tightened by one projection. To further tighten the strap 612, the foregoing steps, illustrated in FIGS. 15B-15F shall again be followed. To loosen the strap 612, the exact opposite sequence of steps are to be followed.

Figure 16:
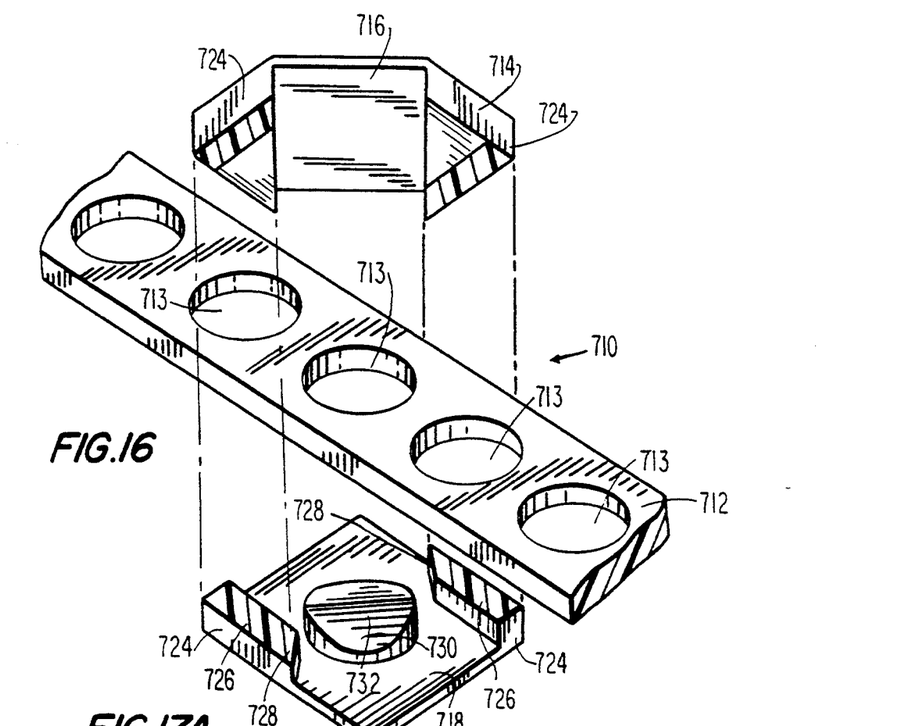
FIG. 16 shows an exploded isometric view of the Two-Way Adjustable Tie strap with circular bores and the holder with generally complimentary projections.
Figure 17A:
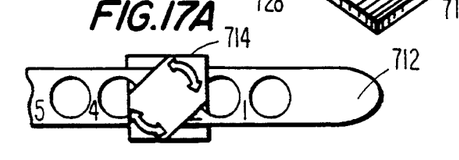
FIGS. 17A-17E shows the consecutive motions which pull the strap to the upper level allowing it to clear the cylindrical projection in the holder and hence become tightened by one projection.
Figure 17B:
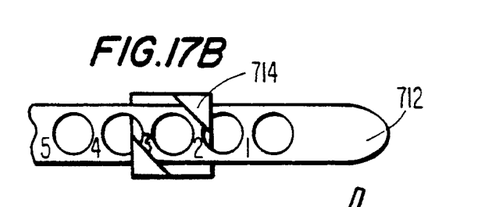
Figure 17C:
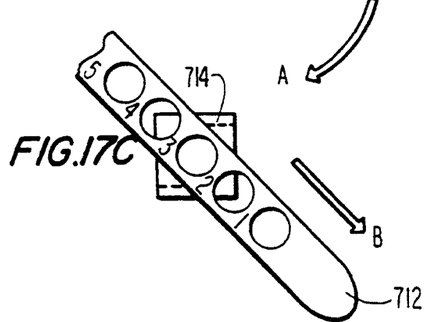
Figure 17D:
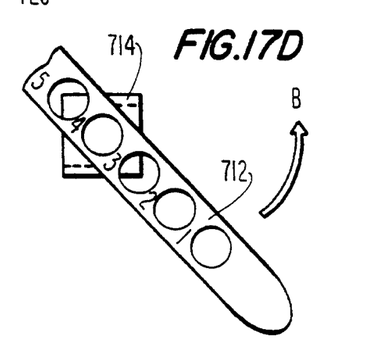
Figure 17E:
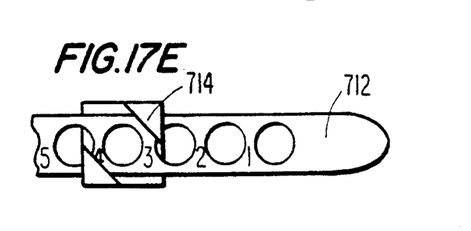

A seventh embodiment of the present invention is shown in FIGS. 16–17E. The tie 710 includes a strap 712 and a holder 714. The strap 712 includes a plurality of circular bores 713. The holder 714 includes an upper inner surface 716 and a lower inner surface 718. The upper inner surface 716 is integrally connected to the lower inner surface 718 as a one piece assembly by two connecting members 724. The inner surfaces of the connecting members 724 adjacent to the upper inner surface 716 are parallel to each other and are separated by a distance slightly larger than the strap width. The inner surfaces of the connecting members 724 adjacent to the lower inner surface 718 are also parallel to each other and are separated by a distance slightly larger than the strap width and include a triangular-shaped portion 728. The lower inner surface 718 also includes a cylindrical projection 730 projecting towards the upper inner surface 716. The cylindrical projection 730 is located in the center of the lower inner surface 718. The cylindrical projection 730 is beveled on opposite sides. The greatest height of the projection 730 being along a center line 732. The maximum height of the projection 730 along the center line 732 is approximately half the distance between the upper inner surface 716 and the lower inner surface 718.

FIG. 17A shows the tie 710 in the locked position. The consecutive motions required between the holder 714 and the strap 712 to tighten the strap are shown in FIGS. 17B–17E. First, to unlock, the strap 712 is rotated in the clockwise direction as indicated by arrow A in FIG. 17B. Next, the strap 712 is lifted in the direction out of the paper, sliding over the beveled edge of the cylindrical projection 730, such that the plane of the lower bottom surface of the strap 712 is above the plane of the upper most portion of the cylindrical projection 730 of the holder 714. The tie is now unlocked and the strap may be tightened or loosened by one or more bores by moving in the direction of arrow B or the direction opposite to arrow B. Then, to tighten, the strap 712 is moved in the direction of arrow B as indicated in FIG. 17C. Once the strap 712 has been advanced by one bore or more, the strap is then released and allowed to return to the lower planar position within the holder 714 such that the next advanced bore 713 fits around the circular projection 730. The strap 712 is then locked by rotating it in the counterclockwise direction as indicated by arrow B in FIG. 17D. Finally, the strap 712 is in the position as indicated in FIG. 17E with respect to the holder 714. The strap 712 has now been tightened by one bore with respect to the holder 714 as illustrated in FIG. 17E. The strap is guided in either level by the parallel inner portions of the connecting members. The upper and lower parallel portions being at an angle of 45 degrees to each other.

Figures 18, 19A, 19B, 19C, 19D, 19E:
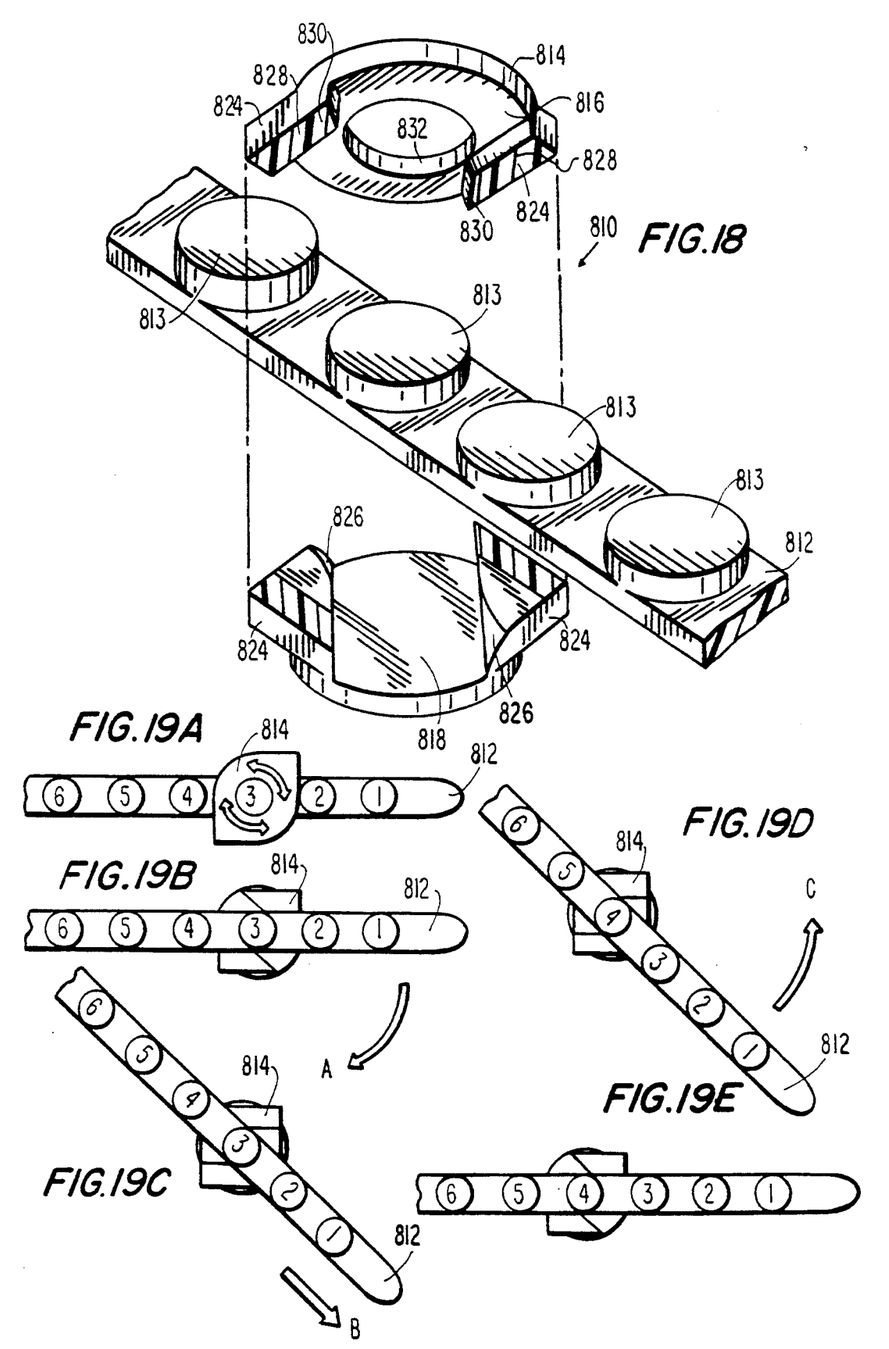
FIG. 18 shows an exploded isometric view of the Two-Way Adjustable Tie strap with cylindrically-shaped projections and the holder with a generally complimentary bore in the holder.
FIGS. 19A-19E shows the consecutive motions which allow the strap to fall to the lower level which is required to tighten the tie by one projection.

An eighth embodiment of the present invention is shown in FIGS. 18–19E. The tie 810 includes a strap 812 and a holder 814. The strap 812 includes a plurality of cylindrical projections 813. The holder 814 includes an upper inner surface 816 and a lower inner surface 818. The upper inner surface 816 is integrally connected to the lower inner surface 818 as a one-piece assembly by connecting members 824. The connecting members 824 adjacent to the lower inner surface 818 have parallel inner surfaces and exterior beveled edges 826. The connecting member 824 adjacent to the upper inner surface 816 also have parallel inner surfaces. The upper set of parallel inner surfaces is at a 45 degree angle to the lower set of parallel inner surfaces and act as a guide for the strap on each level. The upper inner surface 816 also includes a central cylindrical bore 832. A diameter of the bore 832 is sized to be slightly larger than a diameter of the cylindrical projection 813 of the strap 812.

FIG. 19A shows the tie 810 in the locked position. The consecutive motions required between the holder 814 and the strap 812 to tighten the strap are shown in FIGS. 19B–19E. First, the strap 812 is rotated in the clockwise direction as indicated by arrow A in FIG. 19B. After the strap 812 reaches the position illustrated in FIG. 19C, the strap 812 is moved into the paper such that the lower bottom surface of the strap 812 abuts the lower inner surface 818 of the holder such that the top of the projection 813 is below the planar surface of the upper inner surface 816. The tie is now unlocked and the strap may be adjusted (tightened or loosened) by one or more projections 813 in either direction. The strap 812 is then moved in the direction of arrow B as indicated in FIG. 19C. The strap 812 can now be moved by one or more projections 813. Next, to lock, the strap 812 slides above the beveled edge in the direction out of the paper FIG. 19D such that the lower bottom surface of the strap 812 is above the upper surface of the beveled portions 826 of the connecting members 824 and such that one of the cylindrical projections 813 is within the bore 832 of the holder 814. The strap 812, as illustrated in FIG. 19E, has now been tightened by one projection with respect to the holder 814.

Figures 20, 21A:
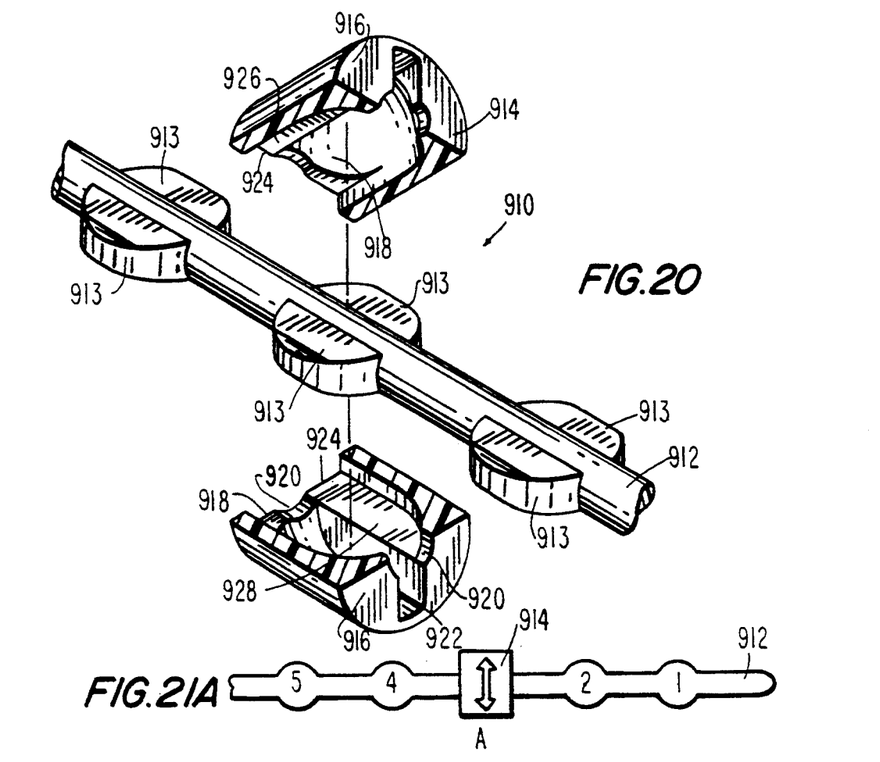
FIG. 20 shows an exploded isometric view of the Two-Way Adjustable Tie strap with pair of generally semicircular projections and a barrel-shaped holder having generally perpendicular slotted axial end openings.
FIGS. 21A-21E show the consecutive turning movements on the holder required to tighten the tie of FIG. 20 by one projection.
Figure 21B:
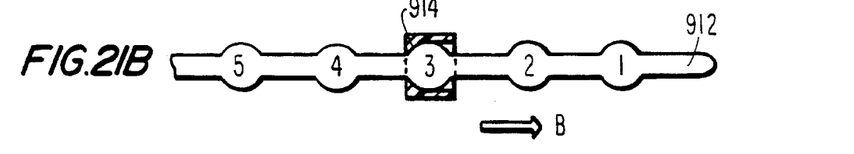
Figure 21C:
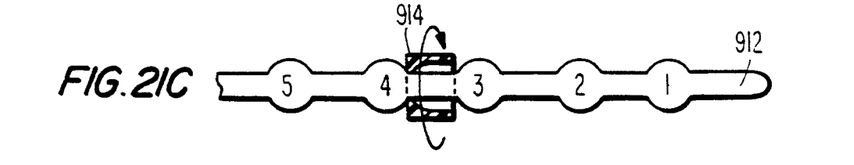
Figure 21D:
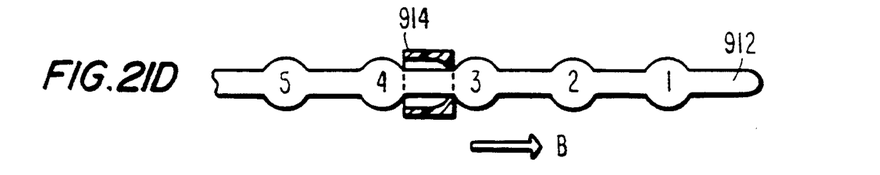
Figure 21E:
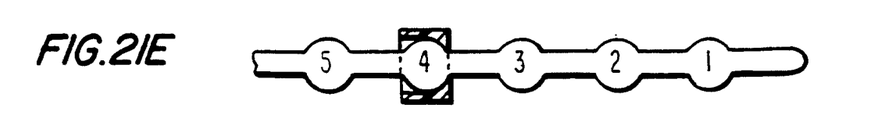

The ninth embodiment of the present invention is shown in FIGS. 20–21E. The tie 910 includes a strap 912 and a holder 914. The strap 912 includes a plurality of semicircular projections 913. The semicircular projections 913 are located in pairs diametrically opposite one another and axially spaced along the strap 912. The holder 914 is a cylindrically-shaped hollow member having a first axial end 916 and a second axial end 918. Each axial end 916 and 918 includes a central axial bore 920 whose diameter is slightly larger than the diameter of the strap 912. The first axial end 916 also includes a rectangular-shaped radial slot 922 whose radial dimension is slightly larger than the radial dimension of the semicircular projections 913. The second axial end 918 also includes a rectangular-shaped radial slot 924 whose radial dimension is slightly larger than the radial dimension of the semicircular projections 913. The slot 922 is substantially perpendicular to the slot 924. A pair of rectangular bar-shaped members 926 and 928 are also within the holder 914. The bar-shaped members 926 and 928 are placed parallel to the central axis of the holder 914 and are located diametrically opposite one another.

FIG. 21A shows the tie 910 in the locked position. The consecutive motions required between the holder 914 and the strap 912 to tighten the strap are shown in FIGS. 21B–21E. First, the holder 914 is rotated with respect to the strap 912 in the direction indicated by the arrow A until the semicircular projections 913 are stopped by the bar-shaped members 926 and 928 within the holder 914. Next, the strap 912 is pulled in the direction of the arrow B as shown in FIG. 21B. The semicircular projections 913 will now pass through the rectangular slot 922 in the first axial end 916 of the holder 914. Once the strap 912 has reached the position indicated in FIG. 21C, the holder 914 is rotated in the reverse direction with respect to the strap 912 by approximately 90 degrees. The semicircular projections 913 now line up with the rectangular slot 924 in the second axial end face 918 of the holder 914. The strap 912 can now be pulled along the direction of arrow B as indicated in FIG. 21D until the semicircular projections 913 are once again within the holder 914 as shown in FIG. 21E. The strap 912 has now been tightened with respect to the holder 914 by one projection. To further tighten the strap 912 with respect to the holder 914, the aforementioned steps are to be followed. To loosen the strap 912 with respect to the holder 914 the pull is from the direction opposite to B.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A two-way adjustable tie comprising:
   (a) a strap having a plurality of projections, said plurality of projections extending substantially symmetrically along said strap;
   (b) a holder having an upper member, a lower member and a pair of connecting members, said connecting members integrally connect said upper and lower members as a one piece assembly, said holder having means for defining a first connecting position and a second connecting position of said holder with respect to said strap;
   (c) an incremental tightening means for incrementally tightening said strap, wherein said holder cooperates with said strap to permit discrete tightening of said strap when said strap and said holder are in a first orientation corresponding to said first connecting position with respect to each other; and
   (d) an incremental loosening means for incrementally loosening said strap, wherein said holder cooperates with said strap to permit discrete loosening of said strap when said strap and said holder are in a second orientation corresponding to said second connecting position with respect to each other.

2. A two-way adjustable tie according to claim 1 wherein said plurality of projections on said strap are a first set of ratchet teeth on an upper surface of said strap and a second set of ratchet teeth on a lower surface of said strap, said first set of ratchet teeth being oriented in a direction opposite to said second set of ratchet teeth.

3. A two-way adjustable tie according to claim 2 wherein an upper inner surface of said upper member and a lower inner surface of said lower member each include at least one ratchet tooth.

4. A two-way adjustable tie according to claim 3 wherein said at least one ratchet tooth on said upper inner surface is oriented in the opposite direction and is parallel with respect to said at least one ratchet tooth on said lower inner surface.

5. A two-way adjustable tie according to claim 4 further including a locking means for maintaining a length of said strap with respect to said holder when said strap and said holder are in a third orientation with respect to each other.

6. A two-way adjustable tie according to claim 5 wherein said at least one ratchet tooth includes an elasticity means for increasing the holding force of said at least one ratchet tooth.

7. A two-way adjustable tie according to claim 3 wherein said at least one ratchet tooth on said upper inner surface is oriented in the opposite direction and is at an angle with respect to said at least one ratchet tooth on said lower inner surface.

8. A two-way adjustable tie according to claim 7 further including a continuous release means whereby said strap moves smoothly in either direction for continuous tightening or loosening said strap when said strap and said holder are in a third orientation with respect to each other.

9. A two-way adjustable tie according to claim 8 wherein said at least one ratchet tooth includes an elasticity means for increasing the holding force of said at least one ratchet tooth.

10. A two-way adjustable tie comprising:
    (a) a strap having a plurality of projections, said plurality of projections extending substantially symmetrically along said strap;
    (b) a holder having an upper member, a lower member and a pair of connecting member, said connecting members integrally connect said upper and lower members as a one piece assembly, said holder having means for defining a first connecting position and a second connecting position of said holder with respect to said strap;
    (c) a holding means for maintaining the general length of said strap when said strap and said holder are in a fixed orientation corresponding to said first connecting position with respect to each other; and
    (d) an adjusting means for selectively adjusting the length of said strap by permitting discrete movement of said strap through said holder in a first direction to tighten said strap and in a second opposite direction to discretely loosen said strap when said strap and said holder are in an orientation corresponding to said second connecting position other than said fixed orientation with respect to each other.

11. A two-way adjustable tie according to claim 10 wherein said plurality of projections are generally triangular-shaped and are alternately arranged on opposite sides of said strap.

12. A two-way adjustable tie according to claim 11 wherein an inner portion of said connecting members have a generally triangular shape.

13. A two-way adjustable tie according to claim 10 wherein said plurality of projections have a parallelogram-shape.

14. A two-way adjustable tie according to claim 13 wherein an interior portion of said connecting members each have substantially the same parallelogram-shape.

15. A two-way adjustable tie according to claim 14 wherein said connecting members are arcuate-shaped and include a recessed portion on a lower inner surface.

16. A two-way adjustable tie according to claim 14 wherein said interior portion of said connecting members include a recessed portion on a lower inner surface.

17. A two-way adjustable tie according to claim 10 wherein said plurality of projections are circular-shaped and include a bar-shaped transverse member integrally connected at the center of each of said circular-shaped projections.

18. A two-way adjustable tie according to claim 10 wherein said plurality of projections are cylindrically-shaped.

19. A two-way adjustable tie according to claim 18 wherein a planar surface of a first portion of each of said connecting members adjacent to a lower inner surface of said holder are parallel with respect to each other and wherein an external corner of each of said first portion of said connecting members have a beveled edge, a planar surface of a second portion of each of said connecting members adjacent to an upper inner surface of said holder are parallel with respect to each other.

20. A two-way adjustable tie according to claim 19 wherein said upper inner surface includes a central cylindrical bore having a diameter that is slightly larger than a diameter of said cylindrically-shaped projections on said strap.

21. A two-way adjustable tie according to claim 10 wherein said plurality of projections are generally semicircular shaped and are located in pairs diametrically opposite one another and are axially spaced along said strap.

22. A two-way adjustable tie according to claim 21 wherein said holder includes a first axial end, a second axial end and a central bore slightly larger than a diameter of said strap.

23. A two-way adjustable tie according to claim 22 wherein said first axial end and said second axial end each include a rectangular-shaped radial slot whose radial dimension is slightly larger than a radial dimension of said semicircular projections on said strap.

24. A two-way adjustable tie according to claim 23 wherein said rectangular-shaped radial slots of said first and second axial ends are substantially perpendicular to each other.

25. A two-way adjustable tie according to claim 24 wherein rectangular bar-shaped members are located within said holder, a longitudinal axis of said bar-shaped members are parallel to a longitudinal axis of said holder and are located diametrically opposite one another.

26. A two-way adjustable tie comprising:
(a) a strap having a plurality of circular bores, said plurality of circular bores extending substantially symmetrically along said strap:
(b) a holder having an upper member, a lower member and a pair of connecting member, said connecting members integrally connect said upper and lower members as a one piece assembly, said holder having means for defining a first connecting position and a second connecting position of said holder with respect to said strap;
(c) a holding means for maintaining the length of said strap when said strap and said holder are in a fixed orientation corresponding to said first connecting position with respect to each other; and
(d) an adjusting means for selectively adjusting the length of said strap by permitting discrete movement of said strap through said holder in a first direction to tighten said strap and a second opposite direction to discretely loosen said strap when said strap and said holder are in an orientation corresponding to said second connecting position other than said fixed orientation with respect to each other.

27. A two-way adjustable tie according to claim 26 wherein a planar surface of a first portion of each of said connecting members adjacent to a lower inner surface of said holder are parallel with respect to each other and wherein a planar surface of a second portion of each of said connecting members adjacent to an upper inner surface of said holder are parallel with respect to each other.

28. A two-way adjustable tie according to claim 27 wherein said lower inner surface includes a cylindrical member projecting toward said upper inner surface, said cylindrical member having bevelled sides and having a diameter slightly smaller than a diameter of said plurality of circular bores in said strap.

* * * * *